(12) United States Patent
Masuya

(10) Patent No.: US 9,401,878 B2
(45) Date of Patent: Jul. 26, 2016

(54) PACKET SYNCHRONIZATION SWITCHING METHOD AND GATEWAY DEVICE

(75) Inventor: Yuzuru Masuya, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 275 days.

(21) Appl. No.: 12/461,609

(22) Filed: Aug. 18, 2009

(65) Prior Publication Data

US 2010/0074265 A1    Mar. 25, 2010

(30) Foreign Application Priority Data

Sep. 19, 2008   (JP) ................................ 2008-240976

(51) Int. Cl.
  H04L 12/56    (2006.01)
  H04J 3/06     (2006.01)
  H04L 12/939   (2013.01)
  H04L 12/931   (2013.01)

(52) U.S. Cl.
  CPC .............. *H04L 49/552* (2013.01); *H04L 49/40* (2013.01); *H04J 3/0685* (2013.01); *H04L 49/206* (2013.01)

(58) Field of Classification Search
  CPC ..... H04J 3/0685; H04J 3/0655; H04J 3/0658; H04J 3/0638; H04J 3/0641; H04L 49/552; H04L 49/40; H04L 49/206; H04L 45/583; H04L 1/22; H04L 12/40176; H04L 67/1002
  USPC ........................ 370/503, 401, 352; 714/11–13
  See application file for complete search history.

(56) References Cited

U.S. PATENT DOCUMENTS

| | | | | |
|---|---|---|---|---|
| H001882 H | * | 10/2000 | Asthana et al. | 370/503 |
| 6,421,741 B1 | * | 7/2002 | Minyard | 713/375 |
| 7,007,106 B1 | * | 2/2006 | Flood et al. | 709/248 |
| 7,061,942 B2 | * | 6/2006 | Noronha et al. | 370/537 |
| 7,116,634 B1 | * | 10/2006 | Hanselmann | 370/219 |
| 7,269,133 B2 | * | 9/2007 | Lu et al. | 370/219 |
| 7,499,394 B2 | * | 3/2009 | Visser et al. | 370/218 |
| 7,583,683 B2 | * | 9/2009 | Kim | 370/401 |
| 7,793,021 B2 | * | 9/2010 | Priel et al. | 710/106 |
| 7,912,075 B1 | * | 3/2011 | Holland et al. | 370/401 |
| 7,916,757 B2 | * | 3/2011 | Riegel et al. | 370/503 |

(Continued)

FOREIGN PATENT DOCUMENTS

| | | |
|---|---|---|
| JP | 2007-318263 A | 12/2007 |
| JP | 2008-009520 A | 1/2008 |
| JP | 2008-178060 A | 7/2008 |

OTHER PUBLICATIONS

PICMG SFP.0 "System Fabric Plane Format" Mar. 24, 2005.

(Continued)

*Primary Examiner* — Hoang-Chuong Vu
(74) *Attorney, Agent, or Firm* — Rabin & Berdo, P.C.

(57) ABSTRACT

A gateway device includes plural electronic circuit boards with redundant structures, between first and second networks, which are different. The gateway device receives data provided through the first network and, after applying data processing, outputs data to the second network. Data processing reference timings and time information, which are common in the gateway device, are shared, the data processing is executed in synchronization with the reference timings, and synchronized packets are provided. System switching between the electronic circuit boards is executed in accordance with the time information. Thus, packet outputs are synchronously switched.

15 Claims, 14 Drawing Sheets

(56) References Cited

U.S. PATENT DOCUMENTS

| | | | |
|---|---|---|---|
| 2002/0064184 A1* | 5/2002 | Kinoshita et al. | 370/503 |
| 2002/0095221 A1* | 7/2002 | Cook et al. | 700/4 |
| 2002/0107966 A1* | 8/2002 | Baudot et al. | 709/227 |
| 2003/0048746 A1* | 3/2003 | Guess et al. | 370/219 |
| 2003/0120816 A1* | 6/2003 | Berthaud et al. | 709/248 |
| 2003/0212835 A1* | 11/2003 | Berkcan et al. | 709/400 |
| 2003/0227920 A1* | 12/2003 | Benayoun et al. | 370/392 |
| 2004/0042395 A1* | 3/2004 | Lu et al. | 370/225 |
| 2004/0078619 A1* | 4/2004 | Vasavada | 714/4 |
| 2004/0264457 A1* | 12/2004 | Benayoun et al. | 370/389 |
| 2005/0053080 A1* | 3/2005 | Wybenga et al. | 370/401 |
| 2005/0078600 A1* | 4/2005 | Rusmisel et al. | 370/217 |
| 2006/0233137 A1* | 10/2006 | Dantu | H04L 12/5695 370/331 |
| 2007/0116058 A1* | 5/2007 | Rausch et al. | 370/503 |
| 2008/0002669 A1* | 1/2008 | O'Brien et al. | 370/352 |
| 2008/0013550 A1* | 1/2008 | Yamauchi | H04L 47/10 370/400 |
| 2008/0294784 A1* | 11/2008 | Wang | H04L 69/16 709/228 |
| 2009/0046730 A1* | 2/2009 | Shimomura et al. | 370/401 |
| 2011/0213905 A1* | 9/2011 | Wallace et al. | 710/61 |

OTHER PUBLICATIONS

PICMG SFP.1 "Internal TDM" Mar. 24, 2005.

* cited by examiner

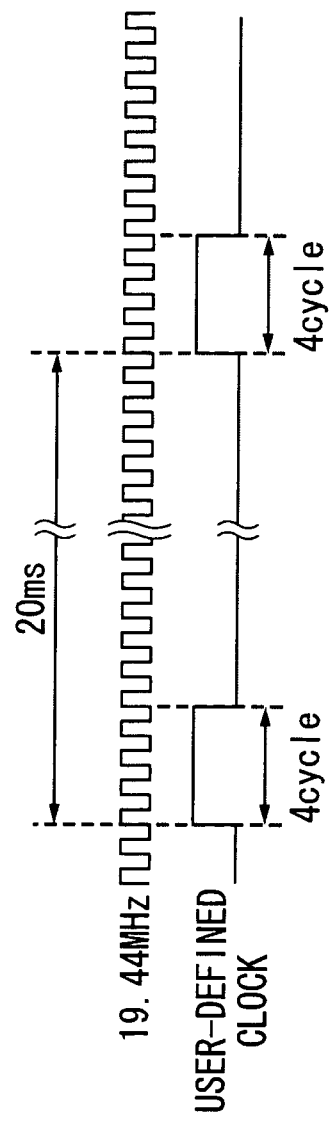

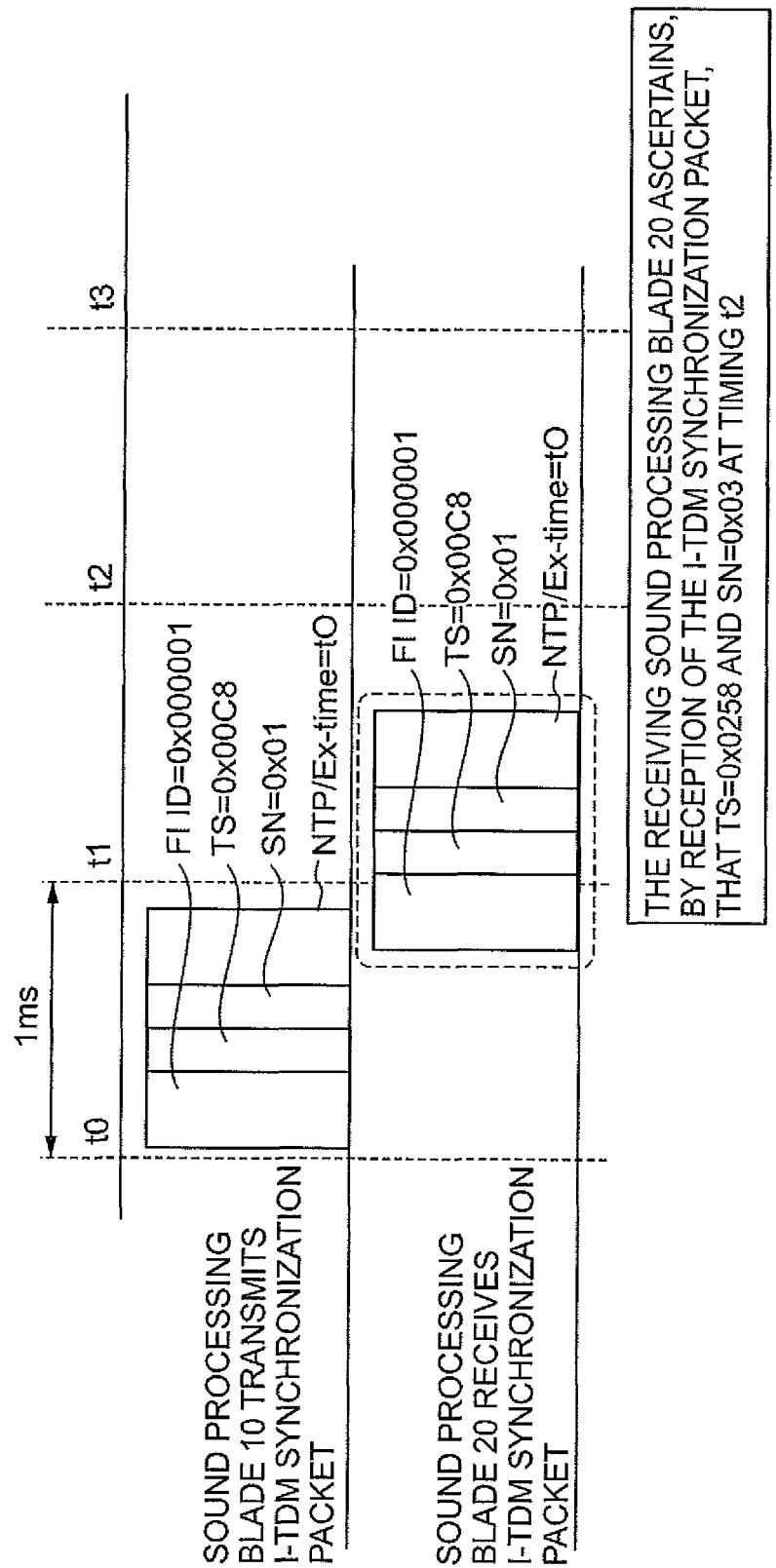

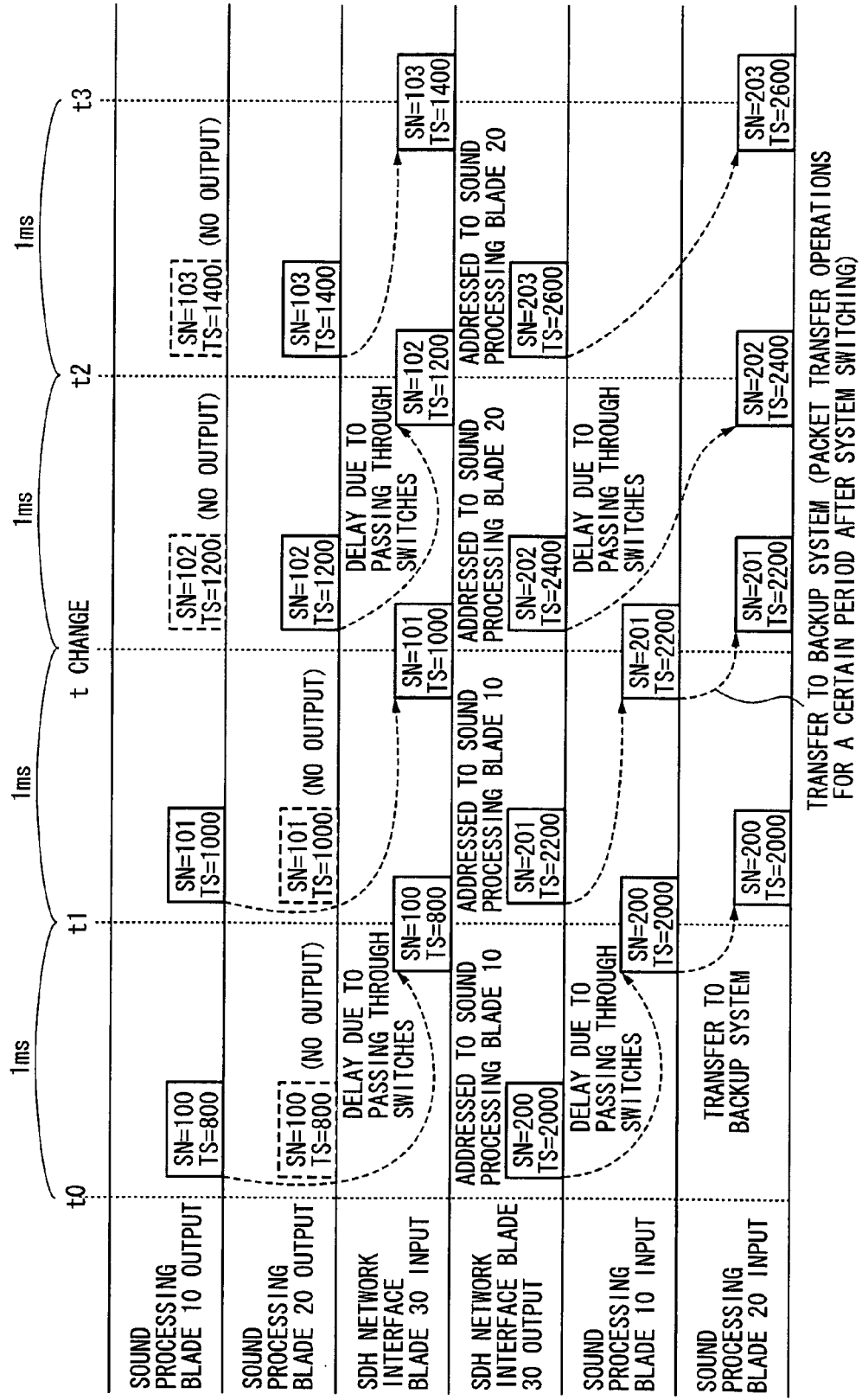

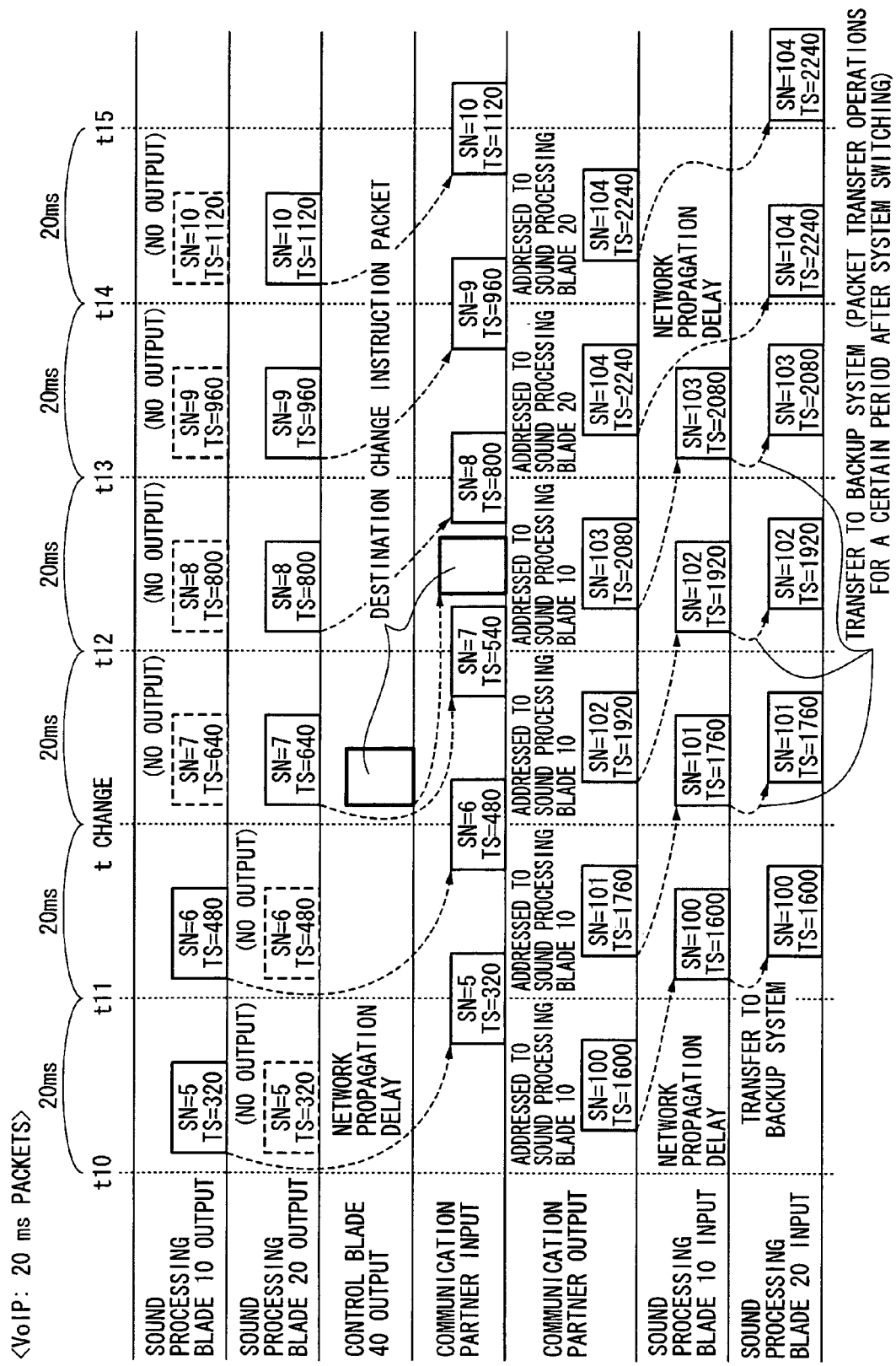

PACKET SYNCHRONIZATION SWITCHING METHOD AND GATEWAY DEVICE

CROSS-REFERENCE TO RELATED APPLICATION

This application claims priority under 35 USC 119 from Japanese Patent Application No. 2008-240976 filed on Sep. 19, 2008, the disclosure of which is incorporated by reference herein.

BACKGROUND OF THE INVENTION

1. Field of the Invention

The present invention relates to a packet synchronization switching method at a gateway device for interconnecting systems/networks with different protocols (communication procedures). The present invention particularly relates to synchronization of data processing timings and packet processing in a device at which a packet-based interface is specified for connections between blades mounted in the device: for example, ATCA (Advanced Telecom Computing Architecture), which is a hardware standard for computers for communications businesses, or the like.

2. Description of the Related Art

FIG. 8 is a conceptual diagram illustrating basic structure of a related art ATCA device conforming to ATCA specifications.

The ATCA device is constituted with a shelf manager 1 that performs internal device management control, a switch blade 2-1 with a switching (SW) function for an intra-device local area network (LAN) between blades that are mounted, blades 2-2 to 2-n with application functions, and a backplane 3 with a distribution function for interconnecting the blades 2-2 to 2-n with the shelf manager 1 and the switch blade 2-1.

A maximum of 16 blades may be mounted, from the switch blade 2-1 to blade 2-n. The shelf manager 1 and the blades 2-2 to 2-n with the application functions are connected to the switch blade 2-1 for performing packet communications through a device internal LAN 3a. The shelf manager 1 is connected with the switch blade 2-1 to blade 2-n by a management bus 3b that is for performing management control of the blades 2-2 to 2-n. The switch blade 2-1 to blade 2-n are connected with a clock bus 3c that is for providing common clock signals in the device.

The switch blade 2-1 to blade 2-n carry out data processing, using the common clock signals as necessary. Transmission and reception of data between the blades 2-2 to 2-n is implemented by packet-based data transmission/reception via switches of the device internal LAN in the switch blade 2-1.

In communications equipment up to now, TDM (time division multiplexing) traffic has often been necessary for data transmission and reception between devices and between blades. As described in PICMG SFP.0 System Fabric Plane Format (Mar. 24, 2005) and PICMG SFP.1 Internal TDM (Mar. 24, 2005), packetization of TDM signals is specified in accordance with the ATCA specifications, and the ATCA specifications have come to be applied over a wider range.

Methods have been proposed for solving problems that arise when the ATCA specifications are applied to various devices. For example, in Japanese Patent Application Laid-Open (JP-A) No. 2008-9520, in relation to data transfers between the blades 2-1 to 2-n, a method is proposed for suppressing effects arising from delays in inter-blade data transfers due to the use of the packet-based device internal LAN 3a.

FIG. 9 is a schematic structural diagram illustrating an example of a related art gateway device.

In order to simplify description, the shelf manager 1, which performs device internal management control, and the backplane 3, with the distribution function for interconnecting between the blades 2-1 to 2-n, of FIG. 8 are omitted from FIG. 9.

A gateway device 4 in FIG. 9 is a device for connecting between, for example, an IP (Internet protocol) network N1 and an SDH (synchronous digital hierarchy) network N2. The IP network N1 is a computer network that is interconnected using IP technology. The SDH network N2 is a synchronous network that is established in accordance with SONET (Synchronous Optical NETwork), which is specified by the ANSI (American National Standards Institute).

The gateway device 4 is equipped with plural blades 5-1, 5-2, etc. which have redundant structures (that is, identical structures), such as an operational sound processing blade 5-1 and a backup sound processing blade 5-2 and the like, and with an SDH network interface blade 6, a control blade 7 and a switch blade 8.

Each of the operational sound processing blade 5-1 and the backup sound processing blade 5-2 is structured with: a PKG control section 5a, an I-TDM processing section 5b including a packet (PKT) processing section 5b-1, an I-TDM (internal TDM)/TDM conversion section 5b-2 and a buffer 5b-3; a sound processing section 5c including a main sound processor 5c-1, a PKT processing section 5c-2 and a PKG retention section 5c-3; a clock reception section 5d; and so forth. The SDH network interface blade 6 is structured with a PKG controller 6a, an SDH/I-TDM conversion section 6b, an SDH terminal section 6c, and so forth. The control blade 7 is structured with a clock management section 7a, a clock transmission section 7b, a device control section 7c, and so forth. The switch blade 8 is structured with a PKG control section 8a, network (NW) switches 8b, and so forth.

The sound processing blades 5-1 and 5-2 are redundantly structured. The operational sound processing blade 5-1 performs sound processing based on a common clock provided from the control blade 7, outputs packets to the IP network N1 that is connected via the network (NW) switches 8b, and outputs data through the network (NW) switches 8b to the SDH network N2 via the SDH network interface blade. The backup sound processing blade 5-2 is in a standby state, stopping output of packets, until system switching is executed by the network (NW) switches 8b.

SUMMARY OF THE INVENTION

The present invention has been made in view of the above circumstances and provides a packet synchronization switching method and a gateway device.

According to an aspect of the invention, there is provided a packet synchronization switching method for synchronously switching output of packets at a gateway device between first and second networks, which are different, the gateway device including a plurality of redundantly structured electronic circuit boards, receiving data provided from the first network and, after performing data processing, outputting data to the second network, the method including: sharing a reference timing of the data processing and time information, which are common in the gateway device; performing the data processing in synchronization with the reference timing and providing the packets, which are synchronized; and executing system switching between the electronic circuit boards in accordance with the time information.

BRIEF DESCRIPTION OF THE DRAWINGS

Preferred embodiments of the present invention will be described in detail based on the following figures, wherein:

FIG. 2A is a chart showing a signal waveform in a case of using a user-defined clock for sound processing timing synchronization.

FIG. 5B is a conceptual diagram illustrating I-TDM synchronization.

FIG. 7A is a diagram illustrating flows of I-TDM packets at a time of system switching.

FIG. 7B is a diagram illustrating flows of VoIP packets at a time of system switching.

DETAILED DESCRIPTION OF THE INVENTION

Figure 1:
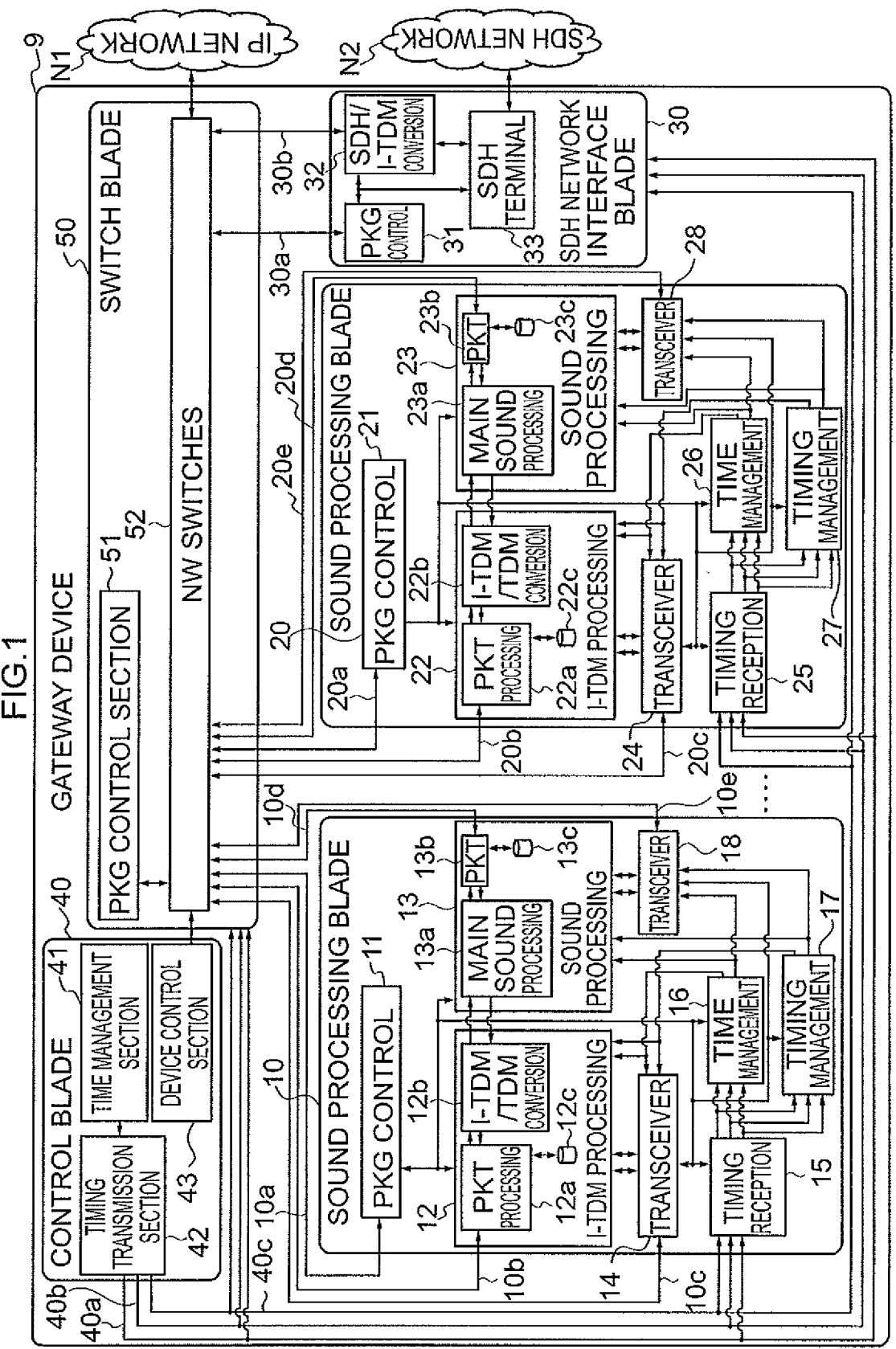
FIG. 1 is a schematic structural diagram illustrating an example of a gateway device relating to a first exemplary embodiment of the present invention.

In the gateway device 4 conforming to the ATCA specifications, in order to provide high reliability, there are numerous redundant structures among sound processing blades 5-1, 5-2, etc.

A redundant structure means, depending on requirements: a twofold structure which operates with one of the redundantly structured sound processing blades 5-1 and 5-2 being specified as an operational system and the other being specified as a backup system; a structure of N+1 duplicates which operate with one sound processing blade (for example, 5-2) being specified as a common backup system for plural operational system sound processing blades 5-1, 5-2, etc. that have the same structure; or the like.

Causes for redundant system switching include a case in which a malfunction occurs in the operational sound processing blade 5-1, a case in which system switching between the operational sound processing blade 5-1 and the backup sound processing blade 5-2 is periodically executed as a preventative measure against silent malfunctions or the like, and so forth.

At a time of system switching, synchronized system switching may be easily realized in the related art gateway device 4 which is a TDM propagation system with common clocks and frame pulses. However, in inter-blade propagations conforming to ATCA with a packet-based data propagation method, no consideration is given to a method of matching up packet output timings. Therefore, packet output timings may not be reliably matched between redundant systems. Consequently, losses, duplications and the like of packets may not be completely eliminated, and sequentiality of data included in packets that is to be sequential may not be assured. Hence, at communication partner devices that are connected to the IP network N1 and the SDH network N2, non-sequential packets and data may be received, and interruptions to communications result. In addition, execution of control of the gateway device 4 is packet based, and a time lag arises for a system switching instruction. As a result, system switching timings between the redundant systems may not be made to coincide.

According to a first aspect of the present invention, a packet synchronization switching method for synchronously switching output of packets at a gateway device between first and second networks, which are different, the gateway device including a plurality of redundantly structured electronic circuit boards, receiving data provided from the first network and, after performing data processing, outputting data to the second network, the method including: sharing a reference timing of the data processing and time information, which are common in the gateway device; performing the data processing in synchronization with the reference timing and providing the packets, which are synchronized; and executing system switching between the electronic circuit boards in accordance with the time information.

According to the present invention, system switching between the electronic circuit boards, which are controlled so as to perform the same operations as redundant systems, is executed on the basis of the common time information. As a result, synchronized and sequential processing data may be transmitted and received, and synchronized packet processing and system switching without losses or duplications of packets is possible.

The best embodiment for carrying out the present invention will become apparent upon reading the following description of a preferred exemplary embodiment in conjunction with the attached drawings. The drawings are solely for description and are not to limit the technical scope of the present invention.

First Exemplary Embodiment

Structure of First Exemplary Embodiment

FIG. 1 is a schematic structural diagram illustrating an example of a gateway device of the first exemplary embodiment of the present invention.

Figure 8:
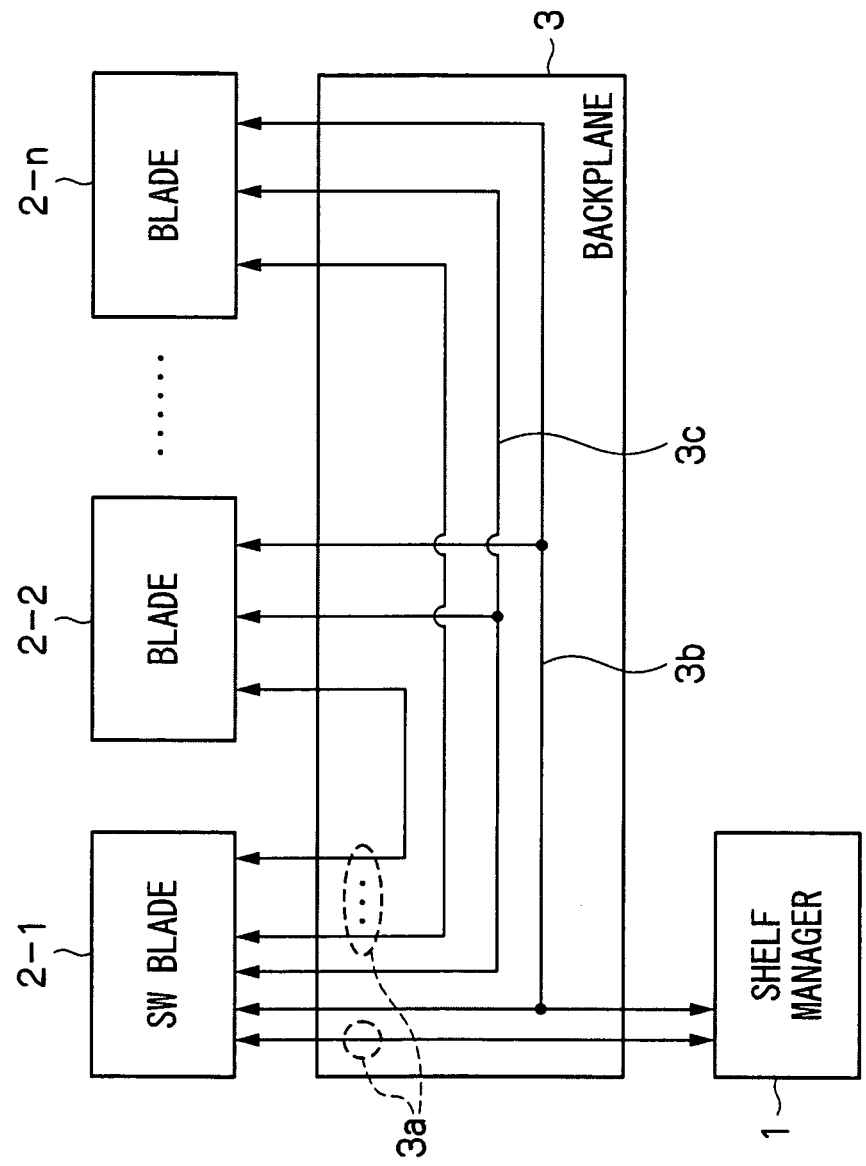
FIG. 8 is a conceptual diagram illustrating basic structure of a related art ATCA device conforming to ATCA specifications.
Figure 9:
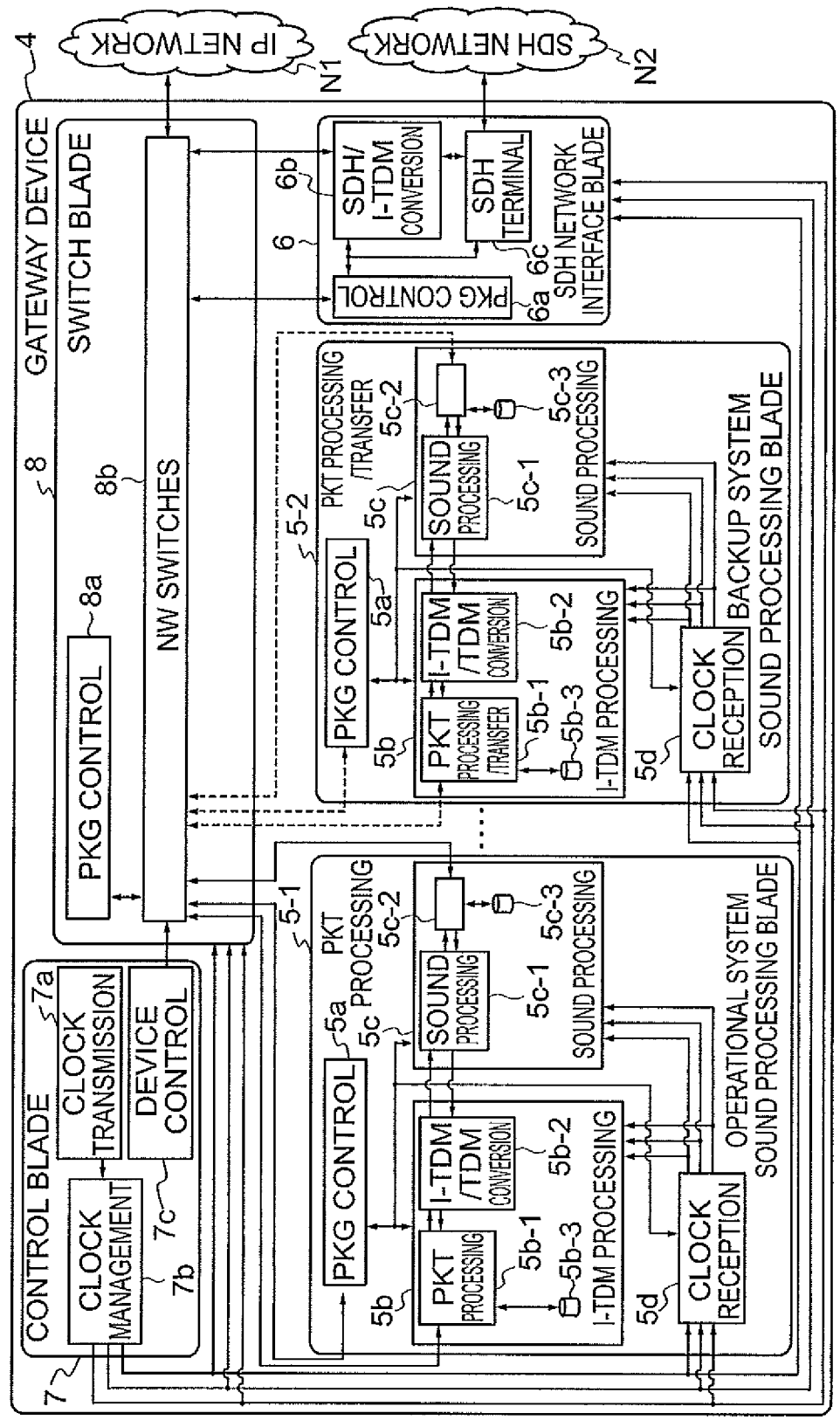
FIG. 9 is a schematic structural diagram illustrating an example of a related art gateway device.

Similarly to FIG. 9 of the related art, in order to simplify description, the shelf manager 1, which performs device internal management control, and the backplane 3, with the distribution function for interconnecting between the blades 2-1 to 2-n, of FIG. 8 are omitted from FIG. 1.

A gateway device 9 of the first exemplary embodiment is a device conforming to the ATCA specifications that is disposed between an IP network N1 and an SDH network N2, similarly to the related art. The gateway device 9 is structured with plural sound processing blades, including redundantly structured first and second electronic circuit boards (for example, sound processing blades) 10 and 20, an SDH network interface blade 30, a control blade 40, a switch blade 50 including a PKG control section 51 and NW switches 52, and the like.

The sound processing blade 10 includes a PKG control section 11 that controls the sound processing blade as a whole, an I-TDM processing section 12, a sound processing section 13, a Label/SN/TS transceiver section 14, a clock and reference timing reception section 15, a PKG internal time management section 16, a data processing timing management section 17 and a chNo./SN/TS transceiver section 18.

The PKG control section 11 is connected with the switch blade 50 by a signal line 10*a* for transmission and reception of device control information to and from the control blade 40. Within the sound processing blade 10, the PKG control section 11 is connected with the I-TDM processing section 12, the sound processing section 13, the Label/SN/TS transceiver section 14, the chNo./SN/TS transceiver section 18, the clock and reference timing reception section 15, the PKG internal time management section 16 and the data processing timing management section 17. The I-TDM processing section 12 is structured with a PKT processing/transfer section 12*a*, an I-TDM/TDM conversion section 12*b*, a buffer 12*c* and the like. The I-TDM processing section 12 is connected with the switch blade 50 by a signal line 10*b*. Within the sound processing blade 10, the I-TDM processing section 12 is connected with the sound processing section 13, the Label/SN/TS transceiver section 14, the PKG internal time management section 16 and the data processing timing management section 17.

The sound processing section 13 is structured with a main sound processor 13*a*, a PKT processing/transfer section 13*b*, a buffer 13*c* and the like. The sound processing section 13 is connected with the switch blade 50 by a signal line 10*d*. Within the sound processing blade 10, the sound processing section 13 is connected with the chNo./SN/TS transceiver section 18, the PKG internal time management section 16 and the data processing timing management section 17. The clock and reference timing reception section 15 is connected with the control blade 40 by signal lines 40*a*, 40*b* and 40*c*. Within the sound processing blade 10, the clock and reference timing reception section 15 is connected with the PKG internal time management section 16 and the data processing timing management section 17. The chNo./SN/TS transceiver section 18 is connected with the switch blade 50 by a signal line 10*e*. Within the sound processing blade 10, the chNo./SN/TS transceiver section 18 is connected with the PKG internal time management section 16 and the data processing timing management section 17.

The sound processing blade 20 is a redundant structure with the sound processing blade 10 (that is, the same structure and the same connections). The sound processing blade 20 includes: a PKG control section 21; an I-TDM processing section 22 structured with a PKT processing/transfer section 22*a*, an I-TDM/TDM conversion section 22*b*, a buffer 22*c* and the like; a sound processing section 23 structured with a main sound processor 23*a*, a PKT processing/transfer section 23*b*, a buffer 23*c* and the like; a Label/SN/TS transceiver section 24, a clock and reference timing reception section 25, a PKG internal time management section 26, a data processing timing management section 27 and a chNo./SN/TS transceiver section 28.

The signal lines 10*a*, 10*b*, 10*c*, 10*d* and 10*e* from the sound processing blade 10 and the signal lines 20*a*, 20*b*, 20*c*, 20*d* and 20*e* from the sound processing blade 20 are illustrated as separate lines for description. However, because propagation is packet based, ordinarily, these lines may be constituted to propagate collectively in accordance with a usage bandwidth thereof.

The SDH network interface blade 30 has an interface function with the SDH network N2, and is structured with a PKG control section 31, an SDH/I-TDM conversion section 32 and an SDH terminal section 33 and the like which are connected to one another. The PKG control section 31 is connected to the switch blade 50 by a signal line 30*a*, and the SDH/I-TDM conversion section 32 is connected to the switch blade 50 by a signal line 30*b*. The SDH terminal section 33 is connected to the SDH network N2.

The control blade 40 includes a clock and reference timing/device internal time management section 41, a clock and reference timing transmission section 42 and a device control section 43, and is connected to the switch blade 50 for device control. For control of the blades from the control blade 40 via the NW switches 52 in the switch blade 50, the control blade 40 is connected with the signal line 10*a* for control of the sound processing blade 10, the signal line 20*a* for control of the sound processing blade 20, and the signal line 30*a* for control of the SDH network interface blade 30. For the distribution of clock and reference timings and device internal time information (a synchronization clock interface under ATCA), the signal lines 40*a*, 40*b* and 40*c* are connected with the sound processing blades 10 and 20, the SDH network interface blade 30 and the switch blade 50.

At the switch blade 50, the PKG control section 51 and NW switches 52 are connected to one another. The NW switches 52 are connected to the sound processing blades 10 and 20, the SDH network interface blade 30 and the control blade 40, and the NW switches 52 are also connected to the IP network N1.

Packet Synchronization Switching Method of the First Exemplary Embodiment

In FIG. 1 of the first exemplary embodiment, a structure of the gateway device 9 is illustrated that includes a function for outputting sound data that is inputted by SDH frame reception from the SDH network N2 to the IP network N1 in VoIP (Voice over Internet Protocol) packets, and a function for outputting VoIP packets received from the IP network N1 to the SDH network N2 in SDH frames. VoIP is a technology for compressing sound by some encoding method (various types of encoding methods) and converting the same to packets, and then performing real-time propagation thereof over an IP network.

Data transfers between the blades 10 and 20 installed in the gateway device 9 are all packet based. Therefore, at the SDH network interface blade 30, sound data from received SDH frames is converted to I-TDM packets and, to be outputted to the sound processing blades 10 and 20, is outputted to the switch blade 50 through the signal line 30*b*. I-TDM packetization is described in PICMG SFP.0 System Fabric Plane Format (Mar. 24, 2005) and PICMG SFP.1 Internal TDM (Mar. 24, 2005). There are two cycles in I-TDM packet synchronization, 1 ms and 125 μs, and it is necessary to attain synchronization thereof for synchronization of sound processing.

The sound processing blade 10 and the sound processing blade 20 are configured as N+1 redundant structures, the sound processing blade 10 being an operational system and the sound processing blade 20 being a common backup system. The SDH network interface blade 30 outputs I-TDM packets addressed to the sound processing blade 10.

At the sound processing blade 10, the PKT processing/transfer section 12a receives I-TDM packets that are received through the signal line 10b from the NW switches 52. The buffer 12c absorbs variations, in order to absorb variations that occur in packet propagation. The I-TDM/TDM conversion section 12b converts the I-TDM package data to TDM data and outputs the TDM data to the sound processing section 13. In the sound processing section 13, the main sound processor 13a applies sound processing, such as echo canceling and the like, to the inputted TDM data, and then outputs the data to the PKT processing/transfer section 13b.

The PKT processing/transfer section 13b forms VoIP packets to match a predetermined cycle specified by the PKG control section 11 and, to output the packets to the IP network N1 that is connected to the device, the PKT processing/transfer section 13b outputs packets addressed to an address specified by the PKG control section 11 through the signal line 10d to the NW switches 52 in the switch blade 50. The switch blade 50 outputs the packets received from the sound processing blade 10 to the IP network N1.

Conversely, VoIP packets from the IP network N1 are inputted via the NW switches 52 in the switch blade 50 and through the signal line 10d to the sound processing blade 10 matching the destination address of the packets. The sound processing blade 10 receives the received VoIP packets at the PKT processing/transfer section 13b, absorbs variations with the buffer 13c that is for absorbing variations, and then outputs the VoIP packets to the main sound processor 13a. At the main sound processor 13a, processing for packet loss compensation and the like is applied, and the data is outputted to the I-TDM processing section 12 as TDM data. The I-TDM processing section 12 packetizes the TDM data received by the I-TDM/TDM conversion section 12b to match a packetization cycle designated by the PKG control section 11, and outputs the packets to the PKT processing/transfer section 12a.

The PKT processing/transfer section 12a generates an I-TDM packet header on the basis of a flow ID and flow bundle designated by the PKG control section 11 and, to output an I-TDM packet addressed to the SDH network interface blade 30, outputs the I-TDM packet through the signal line 10b to the NW switches 52 in the switch blade 50. The SDH network interface blade 30 converts data from the I-TDM packet, which is received by the SDH/I-TDM conversion section 32 through the signal line 30b from the NW switches 52, to the SDH frame format, and outputs the SDH frame format to the SDH network N2 via the SDH terminal section 33.

The sound processing blade 20 has connections with the same configuration as the sound processing blade 10, and is ordinarily in a non-operational state, serving as a backup system in the device. When the sound processing blade 10 is to be switched from an operational state to a non-operational state by system switching, system switching is executed with the sound processing blade 20 being designated as a redundant system. In order to completely eliminate losses, duplications and the like of packets during the system switching, it is necessary for sound processing timings and packet output timings to match up between the sound processing blade 10 and the sound processing blade 20. A method of specifying device internal times and realizing synchronized system switching using a synchronization interface outputted from the control blade 40, in order to satisfy this requirement, is illustrated below.

In the ATCA specifications, it is prescribed that respective clock signals of a synchronization interface are outputted from any single blade. The gateway device 9 of FIG. 1 includes a function for managing device internal reference timings at the control blade 40, generates an 8 kHz clock, a 19.44 MHz clock and a user-defined clock for the synchronization clock interface with the clock and reference timing/device internal time management section 41, and outputs the clocks to the clock and reference timing transmission section 42 for distribution to the blades 10 and 20. At the clock and reference timing transmission section 42, a driver circuit is structured to suppress effects on the other blades of insertion and extraction of the plural blades that are connected.

A signal in the signal line 40a from the clock and reference timing/device internal time management section 41 is the redundant 8 kHz system clock, which is the first clock pair of a synchronization clock interface in the ATCA specifications. A signal in the signal line 40b is the redundant 19.44 MHz system clock, which is the second clock pair of the synchronization clock interface in the ATCA specifications. A signal in the signal line 40c is a user-defined clock as the third clock pair of the synchronization clock interface in the ATCA specification. In this first exemplary embodiment, the signal in the signal line 40c is used for synchronization of sound processing timings in the device and for device internal time synchronization.

Figure 2B:
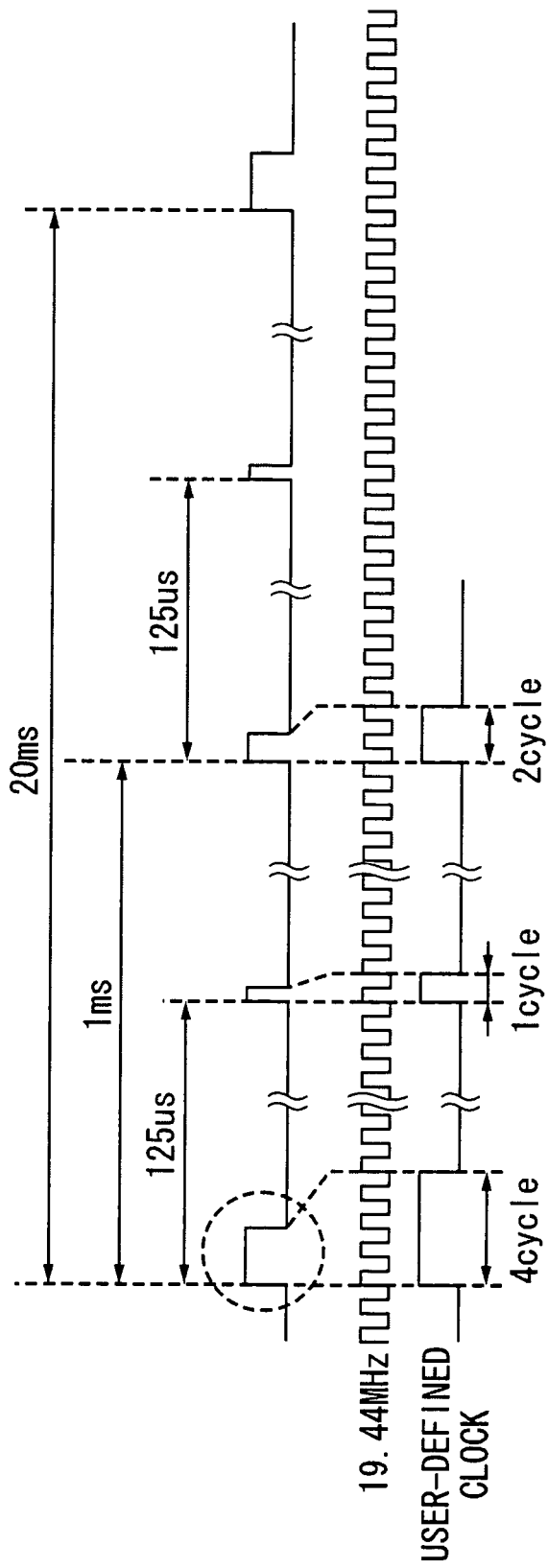
FIG. 2B is a chart showing another signal waveform in a case of using a user-defined clock for sound processing timing synchronization.

FIG. 2A is a chart showing a signal waveform in a case of using the user-defined clock for sound processing timing synchronization. FIG. 2B is a chart showing another signal waveform in a case of using a user-defined clock for sound processing timing synchronization.

As illustrated in FIG. 2A, in a case in which, for example, a maximum period of a packetization cycle of the packets received and transmitted through the IP network N1 is 20 ms, in order to match timings at which VoIP packets are outputted between the sound processing blade 10 and the sound processing blade 20, it is necessary to match the timings of 20 ms cycles. Accordingly, the timings of the VoIP packetization cycles at the blades 10 and 20 are matched up by outputting reference timings of the 20 ms cycles with the user-defined clock. I-TDM packetization cycles are required to match timings of 1 ms or 125 μs cycles. For 1 ms cycles, the timings may be made to match on the basis of the 20 ms cycles. For 125 μs cycles, the timings may be made to match on the basis of the 8 kHz system clock that is the first clock pair of the synchronization clock interface.

As illustrated in FIG. 2B, the 125 μs, 1 ms and 20 ms timings may be multiplexed and outputted in the user-defined clock. With such a configuration, correction of reference timings in shorter periods is possible.

Figure 3A:
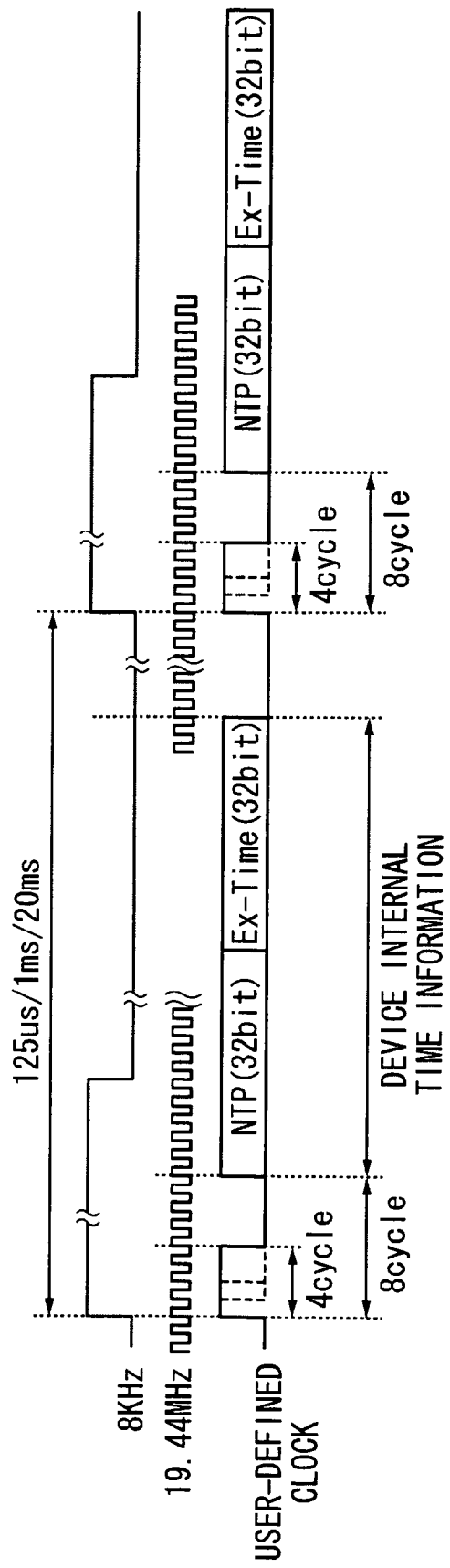
FIG. 3A is a chart illustrating an example of a signal waveform in a case of multiplexing and transmitting device internal time information for device internal time synchronization after the user-defined clock illustrated in FIG. 2B.
Figure 3B:
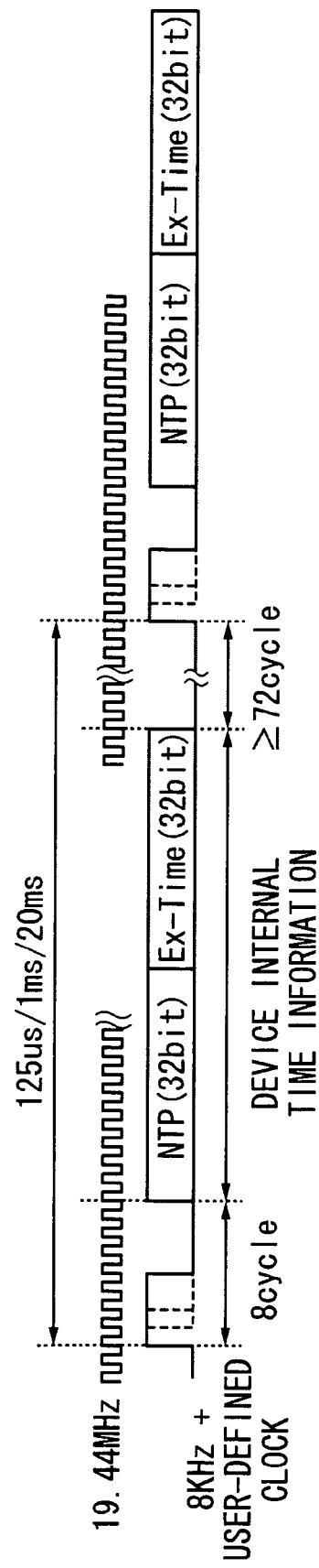
FIG. 3B is a chart illustrating a variant example of a signal waveform in a case of multiplexing 1 ms and 20 ms timings with a redundant 8 kHz system clock, which is a first clock pair of a synchronization clock interface of the ATCA specification, and thereafter multiplexing and transmitting device internal time information for device internal time synchronization.

FIG. 3A is a chart illustrating an example of a signal waveform in a case of multiplexing and transmitting device internal time information for device internal time synchronization after the user-defined clock illustrated in FIG. 2B. FIG. 3B is a chart illustrating a variant example of a signal waveform in a case of multiplexing the 1 ms and 20 ms timings with the redundant 8 kHz system clock that is the first clock pair of the synchronization clock interface of the ATCA specification, and thereafter multiplexing and transmitting the device internal time information for device internal time synchronization.

As the device internal time information, in addition to 32 bits of information the same as in NTP (Network Time Protocol), which is a protocol for synchronizing times in devices of equipment connected to a network to accurate times, for example, a count value based on the 19.44 MHz system clock that is the second clock pair of the synchronization clock interface may be multiplexed as extended time information based on the same system clock. For the count value, an arrangement of bits to match system requirements is determined, such as the upper 16 bits being a count value which increments at 125 μs intervals and the lower 16 bits being a count value up to 125 μs, or the like. Thus, this may be employed as a more easy-to-use synchronization clock.

At the sound processing blade 10 of the gateway device 9 in FIG. 1, the clocks for the synchronization interface that are outputted from the control blade 40 are received by the clock and reference timing reception section 15, and signals that are converted in level to board input signals are outputted to the PKG internal time management section 16 and the data processing timing management section 17.

The PKG internal time management section 16 manages times the same as the device management times managed at the control blade 40 on the basis of the received NTP and extended time information (Ex-Time), and the PKG internal time management section 16 outputs time information to the Label/SN/TS transceiver section 14 for I-TDM packet synchronization and to the chNo./SN/TS transceiver section 18 for VoIP packet synchronization. The data processing timing management section 17 matches up the packetization cycles for sound processing timing synchronization with the reference timings managed by the control blade 40, and outputs the sound processing timings to the I-TDM processing section 12, the Label/SN/TS transceiver section 14, the chNo./SN/TS transceiver section 18 and the sound processing section 13.

At the sound processing blade 20, the SDH network interface blade 30 and the switch blade 50 too, times the same as the device management times are managed using the clocks for the synchronization interface from the control blade 40, and packetization cycles for sound processing timing synchronization are matched up with the reference timings managed by the control blade 40.

According to the above, time information that is matched up between each blade in the device is managed, and sound processing timings may be caused to match.

System switching operations between the sound processing blade 10 and the sound processing blade 20 in these conditions will be described in detail.

Figure 4:
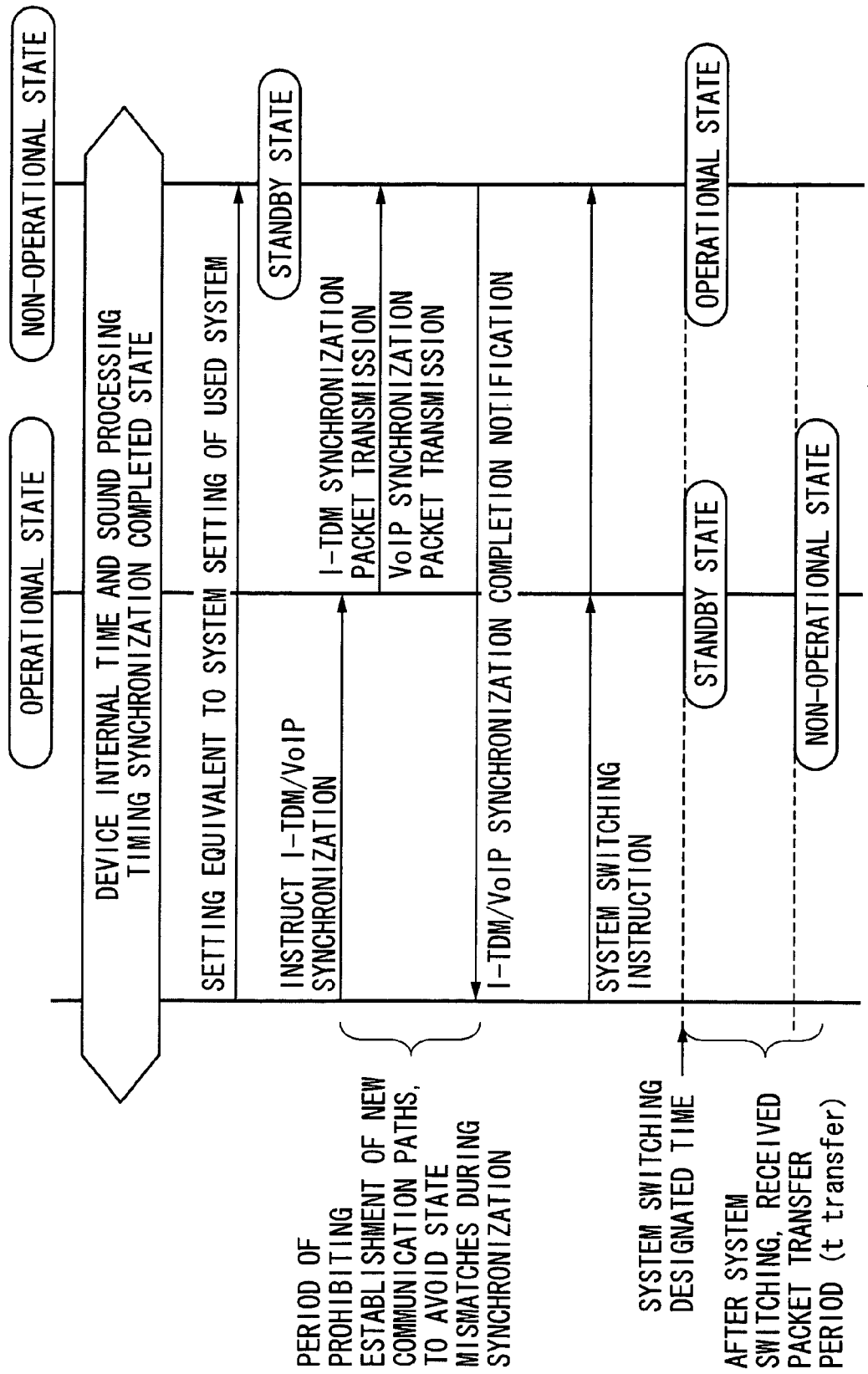
FIG. 4 is a diagram illustrating schematics of an operation sequence of a control blade 40, a sound processing blade 10 and a sound processing blade 20.

FIG. 4 is a diagram illustrating schematics of an operation sequence of the control blade 40, the sound processing blade 10 and the sound processing blade 20.

The control blade 40 selects the sound processing blade 20 to be a redundant system blade of the sound processing blade 10. At the sound processing blade 20, system setting details which have been previously set for the sound processing blade 10 are set to system settings the same as at the sound processing blade 10 by the control blade 40. Hence, the sound processing blade 20 is in a standby state serving as a redundant system of the sound processing blade. Until the subsequent system switching processing ends, for new system setting details, the same settings are applied from the control blade 40 to both the sound processing blade 10 and the sound processing blade 20, and system setting states of the sound processing blade 10 and the sound processing blade 20 are continuously made to match.

At a time at which the system setting states match, the control blade 40 instructs the execution of synchronization processing, of the sound processing blade 20 with respect to the sound processing blade 10, of the systems in relation to I-TDM packets and VoIP packets (an I-TDM/VoIP synchronization instruction). The sound processing blade 10, upon receiving the system synchronization instruction from the control blade 40, notifies a sequence number and a time stamp, which are sequencing data required for I-TDM packetization, to the sound processing blade 20 designated as the redundant system (I-TDM synchronization packet transmission).

Figure 5A:
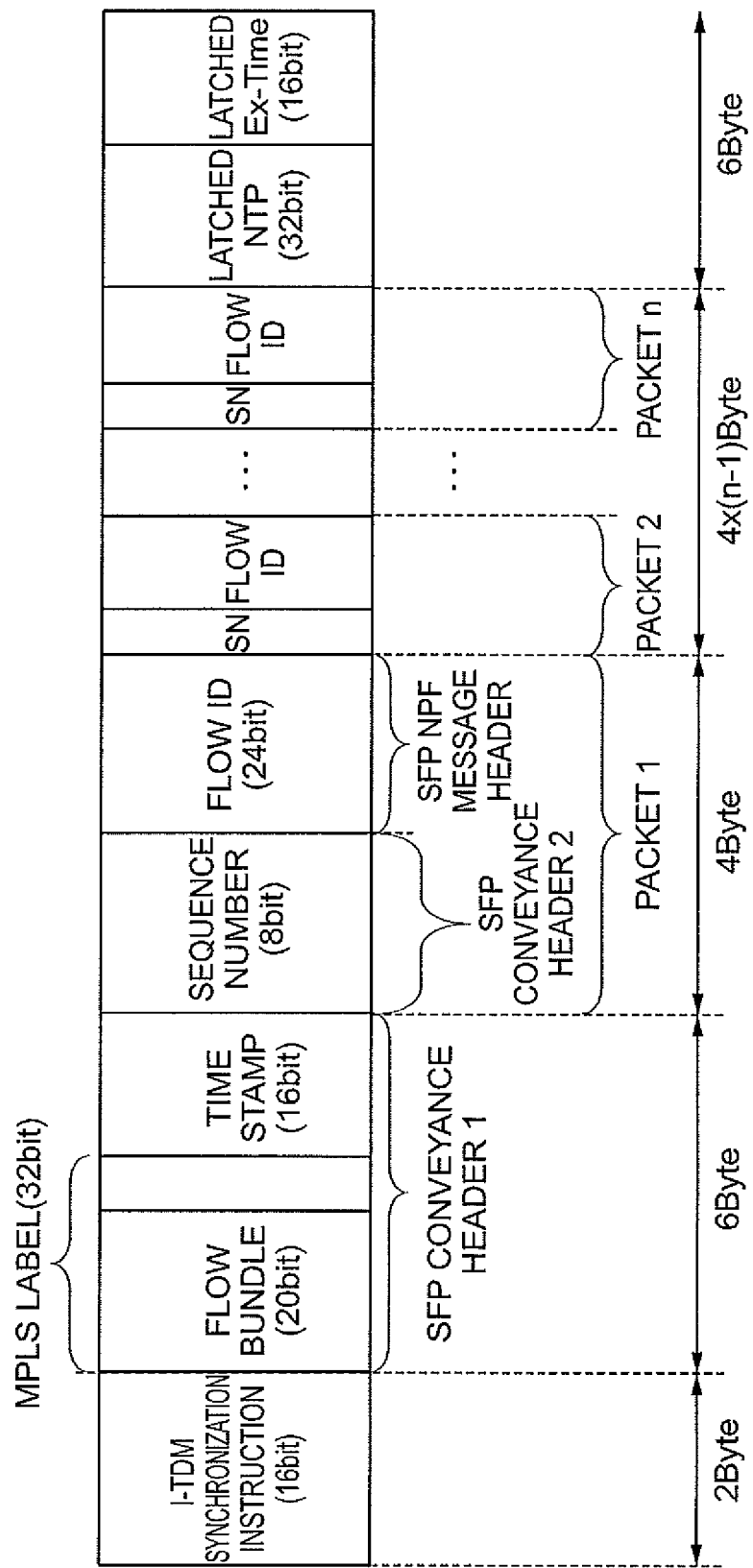
FIG. 5A is a diagram illustrating an example of an I-TDM synchronization packet format.

FIG. 5A is a diagram illustrating an example of an I-TDM synchronization packet format.

This packet format includes I-TDM synchronization instruction information for packet identification, and follows with information relating to I-TDM packets. This includes a flow bundle for identification of the source node of an individual I-TDM frame and a time stamp associated therewith, and sequence numbers and flow IDs of packets that are multiplexed in the frame. If there are multiplexed packets, the sequence numbers and the flow IDs come after. Subsequently, similar information associated with new flow bundles may follow, within the limits of a maximum value for the overall packet length. At the end of the frame, there are an NTP value and extended time information, latched to the time of output of the I-TDM packet of the flow bundle.

Because the device internal time information and the sound processing timing match, the sound processing blade 20 receiving the packet may, based on the device internal time information being managed within that blade and the NTP value and extended time information (Ex-Time) in the currently received I-TDM synchronization packet, match up the frame information of a sound I-TDM packet that is currently being processed with the operational system sound processing blade 10. Thus, I-TDM packets that are next outputted by the sound processing blade 10 and the sound processing blade 20 may be given the same contents.

FIG. 5B is a conceptual diagram illustrating I-TDM synchronization.

At time t0, the flow ID from the sound processing blade 10=0x000001, the time stamp=0x00C8 and the sequence number=0x01. Thus, an I-TDM synchronized packet with details of NTP and Ex-Time for time t0 is transmitted. In the vicinity of a time t1, after a delay duration due to passing through the switch blade 50 has passed, the I-TDM synchronized packet is received at the sound processing blade 20. The sound processing blade 20 ascertains from the contents of the received packet that, for an I-TDM packet with the flow ID=0x000001 at a time t2—the timing of output of the next I-TDM packet—in the contents thereof, the time stamp=0x0258 (for 1 ms packets, this is incremented by 0x00C8 at 1 ms intervals), and the sequence number=0x03. Subsequent to the I-TDM packet that is outputted at the timing of time t2, contents of I-TDM packets outputted from the sound processing blade 10 match with contents of I-TDM packets outputted from the sound processing blade 20.

Actually however, only the sound processing blade 10 that is the operational system outputs I-TDM packets and, while the sound processing blade 20 is in the standby state, the sound processing blade 20 outputs no I-TDM packets addressed to the SDH network interface blade 30.

In a similar manner, sequence numbers and time stamps which are sequencing data required for VoIP packetization are notified by a VoIP synchronization packet (VoIP synchronization packet transmission).

Figure 5C:
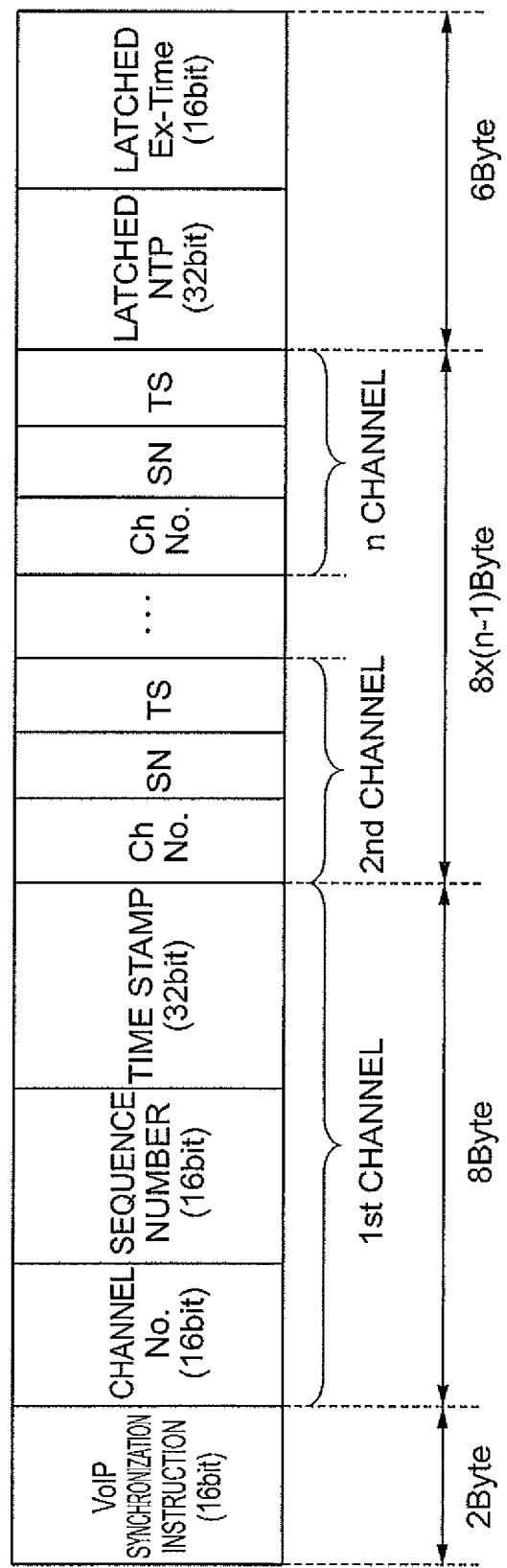
FIG. 5C is a diagram illustrating an example of a VoIP synchronization packet format.

FIG. 5C is a diagram illustrating an example of a VoIP synchronization packet format.

This packet format includes synchronization instruction information for packet identification, and then information relating to VoIP packets. A channel number, and a sequence number and time stamp associated therewith, follows. If processing of plural channels is being executed, the same information follows for each channel number. At the end of the frame, the NTP value and extended time information (Ex-Time) of the sound processing timing are latched to the time at which the VoIP packets of the channels are outputted. Because the device internal time information and the sound processing timings match, the sound processing blade 20 receiving this packet may, based on the device internal time information being managed within that blade and the received NTP value and extended time information (Ex-Time), match up the frame information of a sound VoIP packet that is currently being processed with the operational system sound processing blade 10. Thus, VoIP packets that the sound processing blade 10 and the sound processing blade 20 output at a next VoIP packet output timing may be given the same contents. Actually however, only the sound processing blade 10 that is the operational system outputs VoIP packets and, while the sound processing blade 20 is in the standby state, the sound processing blade 20 outputs no VoIP packets addressed to the IP network N1.

The sound processing blade 20 receives the I-TDM synchronization packet and the VoIP synchronization packet, and at a time at which synchronization with the sound processing blade 10 is complete, notifies the completion of synchronization to the control blade 40 (I-TDM/VoIP synchronization completion notification).

After the system synchronization instructions to the sound processing blade 10, the control blade 40 prohibits the establishment of new packet paths until the synchronization completion notification from the sound processing blade 20 arrives, in order to avoid mismatching of synchronization information during the processing of synchronization of the sound processing blade 10 and the sound processing blade 20.

In order to eliminate audible disruption of sound during the system switching due to mismatches of sound processing states of the sound processing blade 10 and the sound processing blade 20, it is necessary to preparatorily, before the system switching, input to the sound processing blade 20 packets the same as I-TDM packets and VoIP packets that are inputted to the sound processing blade 10, and substantially match up sound processing states of an echo canceler and suchlike. Accordingly, when the sound processing blade 10 receives the system synchronization instructions from the control blade 40, the sound processing blade 10 operates so as to transfer I-TDM packets received from the SDH network interface blade 30 and VoIP packets received from the IP network N1 to the sound processing blade 20 that is specified as the redundant system.

The sound processing blade 20 performs sound processing, similar to operations of the sound processing blade 10, on the packets that are transferred, which are I-TDM packets which have been received from the SDH network interface blade 30 and VoIP packets which have been received from the IP network N1, and operates to bring sound processing states thereof, such as convergence operations of an echo canceler and the like, close to sound processing states of the sound processing blade 10.

When the synchronization completion notification is received from the sound processing blade 20, the control blade 40 outputs a system switching instruction packet to the sound processing blade 10, the sound processing blade 20 and the SDH network interface blade 30 (system switching instruction).

Figure 6:
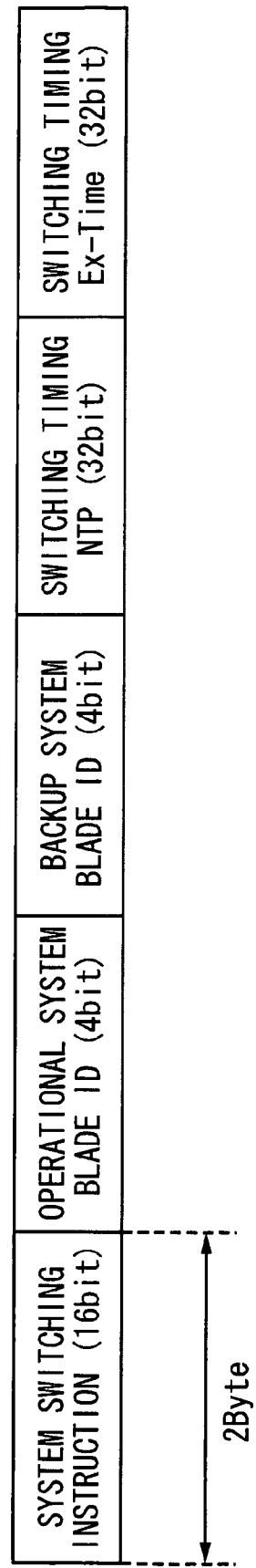
FIG. 6 is a diagram illustrating an example of a system switching instruction packet format.

FIG. 6 is a diagram illustrating an example of a system switching instruction packet format.

This packet format includes system switching instruction information for packet identification, then indicates a synchronization identifier ID of the operation system blade and a synchronization identifier ID of the backup system blade, which are the objects of switching, and then indicates a switching timing based on a device internal management time. Here, synchronization identifier IDs for distinguishing between blades when blades with the same functions are mounted are used. However, physical addresses, IP address values or the like of the blades that are the objects of switching may be directly specified.

FIG. 7A is a diagram illustrating flows of I-TDM packets at the time of system switching.

The packetization cycle of the I-TDM packets is, for example, 1 ms. At time t0, the sound processing blade 10 outputs an I-TDM packet, with values of the sequence number SN=100 and the time stamp TS=800, to the address of the SDH network interface blade 30. Similarly, in accordance with the operation of transferring received packets from the operational system to the backup system subsequent to the time of receiving the synchronization packets, the sound processing blade 20 performs sound processing based on received VoIP packets and carries out generation of I-TDM packets. However, the sound processing blade 20 does not output the I-TDM packets to the address of the SDH network interface blade 30, because this system is in the standby state.

The packets outputted from the sound processing blade 10 are inputted to the SDH network interface blade 30 after a delay duration due to passing through the switch blade 50 has passed. At time t0, the SDH network interface blade 30 outputs an I-TDM packet indicating the values of the sequence number SN=200 and the time stamp TS=2000 to the address of the sound processing blade 10 that is the operational system. At time t1, which is the transmission timing of the next I-TDM packet, a packet with an updated sequence number SN and time stamp TS is outputted in the same manner as at time t0.

If the switching timing of the system switching instruction packet has a value t change, then at the time t change, the sound processing blade 10 stops output of the I-TDM packets which have been outputted to the address of the SDH network interface blade 30 hitherto, and the sound processing blade 10 goes into the standby state. In place thereof, the sound processing blade 20 that has been in the backup system standby state is put into the operational system operation state at the same time in accordance with the contents of the received system switching packet. The sound processing blade 20 takes over the I-TDM packets that the sound processing blade 10 was outputting to the address of the SDH network interface blade 30 hitherto, and outputs an I-TDM packet with values of the sequence number SN=102 and the time stamp TS=1200 to the SDH network interface blade 30, the sequence number SN and time stamp TS being sequential values according to reception processing of the I-TDM synchronization packets. Thus, the synchronized system switching of the transmitted I-TDM packets is completed without occurrences of packet losses, packet duplications or the like at the sound processing blades 10 and 20.

The SDH network interface blade 30 is notified that the system switching of the destination sound processing blades 10 and 20 is to be executed by the contents of the system switching instruction packet that is received. In the case in which the switching timing of the system switching instruction packet has the value t change, then at the time t change, the SDH network interface blade 30 switches the I-TDM packets that were being outputted to the address of the sound processing blade 10 hitherto to the address of the sound processing blade 20 that is the new operational system, and outputs an I-TDM packet indicating the values of the sequence number SN=202 and the time stamp TS=2400. Thus, at the SDH network interface blade 30, a change in destination address of the output packets that matches the system switching timing of the sound processing blades 10 and 20, which are the destination addresses, is possible.

However, after packet propagation through the switch blade 50, an I-TDM packet (SN=201, TS=2200) that is outputted to the address of the sound processing blade 10 reaches the sound processing blade 10 that is already in the backup system standby state, since the completion of system switching, and this packet does not reach the sound processing blade 20 that is now in the operational system operation state. In order to prevent this, for a certain duration t transfer1, which takes account of the packet arrival delay, after the switching time t change according to the system switching instruction packet, operation is performed to transfer an I-TDM packet reaching the sound processing blade 10 that is in the backup system standby state to the address of the sound processing blade 20 that is now in the operational system operation state. In accordance with this operation, packets may be received by the sound processing blade 20 that is the new operating system without losses of the I-TDM packets that are from the SDH network interface blade 30. The sound processing blade 10 already knows the destination address of the sound processing blade 20 that was the redundant system from the ID thereof according to the contents of the system switching instruction packet.

The sound processing blade 10 that is in the backup system standby state completes the system switching to set the state thereof to the non-operational state after the passage of the certain duration t transfer1 that takes account of the packet arrival delay. It is necessary that the SDH network interface blade 30 knows in advance that information of the transmission source address and the like of the received I-TDM packets is to change in accordance with the system switching of the sound processing blades 10 and 20, from the contents of the system switching instruction packet, and it is necessary that occurrences of non-continuity in sound processing are prevented by this information of the received I-TDM packets being changed.

FIG. 7B is a diagram illustrating flows of VoIP packets at the time of system switching.

The packetization cycle of the VoIP packets is, for example, 20 ms. At a time t10, the operational system sound processing blade 10 outputs a VoIP packet designated with a destination address of a communication partner disposed at a destination of the IP network N1, indicating values of the sequence number SN=5 and the time stamp TS=320, to the IP network N1. In accordance with the operation of transferring received packets from the operational system to the backup system subsequent to the time of receiving the synchronization packet, the sound processing blade 20 performs sound processing based on the received I-TDM packets and implements generation of VoIP packets. However, the sound processing blade 20 does not output the VoIP packets to the network N1 because this system is in the standby state. A communication partner device disposed at the destination beyond the IP network N1 receives VoIP packets with a network propagation delay.

A VoIP packet indicating the sequence number SN=100 and the time stamp TS=1600 is outputted from the communication partner disposed at the destination beyond the IP network N1 to the address of the sound processing blade 10 with the packetization cycle of 20 ms, and is inputted into the sound processing blade 10 with a network propagation delay. The sound processing blade 20 receives the VoIP packet transferred from the sound processing blade 10 for sound processing synchronization and performs sound processing. At a time t11, which is the transmission timing of the next VoIP packet, a packet with a respectively updated sequence number SN and time stamp TS is outputted in the same manner as at time t10.

In the case in which the switching timing of the system switching instruction packet has the value t change, at the time t change, the sound processing blade 10 stops output of the VoIP packets which have been outputted to the address of the IP network N1 hitherto, and the sound processing blade 10 goes into the standby state. In place thereof, the sound processing blade 20 that has been in the backup system standby state is put into the operational system operation state at the same time in accordance with the contents of the received system switching packet. The sound processing blade 20 takes over the VoIP packets that the sound processing blade 10 was outputting to the address of the IP network N1 hitherto. The sound processing blade 20 outputs a VoIP packet with values of the sequence number SN=7 and the time stamp TS=640 to the address of the IP network N1, the sequence number SN and time stamp TS being sequential values according to reception processing of the VoIP synchronization packets. Thus, the synchronized system switching of the transmitted VoIP packets is completed without occurrences of packet losses, packet duplications or the like at the sound processing blades 10 and 20.

The control blade 40 outputs a destination change instruction packet to the communication partner device disposed at the destination beyond the IP network N1 at the time of completion of the system switching of the sound processing blades 10 and 20, to notify the communication partner device that the system switching of the sound processing blades 10 and 20 has been executed and to instruct a change in the destination addresses of output VoIP packets from the communication partner device. A VoIP packet from the sound processing blade 20 that is now the operational system in accordance with the prior completion of system switching of the sound processing blades 10 and 20 is inputted before the arrival of the destination change instruction packet. Therefore, it is necessary to notify the communication partner device disposed at the destination beyond the IP network N1 in advance, at a time of communication establishment or the like, that information such as the transmission source address, synchronization identifier ID and the like of the VoIP packets that are received will be changed by the system switching of the sound processing blades 10 and 20, so as to prevent occurrences of non-continuity in sound processing due to changes in this information in the received VoIP packets.

The communication partner device receives the destination change instruction packet, changes the destination address of VoIP packets to be outputted therefrom to the address of the sound processing blade 20 that is the new operational system, and outputs VoIP packets. However, because of the effect of network propagation delay, a VoIP packet from the communication partner device may reach the sound processing blade 10 after the switching timing t change indicated in the system switching instruction packet, and the sound processing blade 20 that is the new operational system may not receive the VoIP packet.

In order to prevent this, for a certain duration t transfer2, which takes account of a packet arrival delay, after the switching time t change according to the system switching instruction packet, operation is performed to transfer VoIP packets reaching the sound processing blade 10 that is in the backup system standby state to the address of the sound processing blade 20 that is now in the operational system operation state. Therefore, the packets may be received by the sound processing blade 20 that is the new operating system without losses of the VoIP packets from the IP network N1. The sound processing blade 10 that is in the backup system standby state completes the system switching to set the state thereof to the non-operational state after the passage of the certain duration t transfer2 that takes account of the packet arrival delay. The sound processing blade 10 already knows the destination address of the sound processing blade 20 that was the redundant system from the ID thereof according to the contents of the system switching instruction packet.

Effects of the First Exemplary Embodiment

According to the first exemplary embodiment, there are effects as in (A) and (B) below.

(A) Time information within the device and processing timings required for sound processing, which are based on clocks that are common in the device, are common between the blades that are mounted. The sound processing blades 10 and 20, which have redundant structure, hand over to one another both the VoIP packets received from the IP network N1 and the I-TDM packets received from the SDH network interface blade 30. Of the contents of the packets that are outputted from a blade that is specified as an operating operational system, sequence number SN and time stamp TS values, which are parameters that need to be sequential, are handed over together with common time information which matches up output timings. Therefore, in the sound processing blades 10 and 20 that are controlled as redundant systems so as to perform the same operations, system switching is executed on the basis of common time information. Therefore, sound processing data that is synchronized and sequential may be transmitted and received, and synchronized packet processing and system switching are possible without packet losses, duplications or the like.

(B) At a timing of system switching, the system switching is executed on the basis of common time information. Therefore, the system switching timing may be realized without there being a time difference between the redundant systems, and synchronized system switching is possible without packet losses, duplications or the like.

Variant Examples

The present invention is not to be limited by the first exemplary embodiment; numerous modes of use and modifications are possible. These modes of use and variants are as in, for example, the following (1) to (3).

(1) The first exemplary embodiment is an example in which the packets between the sound processing blades 10 and 20 and the SDH network interface blade 30 are I-TDM packets, and the packets between the blades and the IP network N1 are VoIP packets. A packet system in place thereof may be packet processing that is synchronized such that sequential values are obtained by, similarly, parameters that need to be sequential being handed over between the sound processing blades in the contents of packets. Instead of the SDH network N2, another IP network may be employed.

(2) In the first exemplary embodiment, an example is illustrated in which the reference timings and device internal time information for sound processing synchronization are shared using the user-defined clock of the synchronization clocks conforming to the ATCA specifications. However, the reference timings and device internal time information for sound processing synchronization may be shared using a signal in which the reference timings and the device internal time clock are multiplexed as shown in FIG. 3B without regard to the ATCA specifications. With such a configuration, distribution resources in the device may be employed more efficiently.

(3) The gateway device 9 of the first exemplary embodiment may be altered to a structure other than that illustrated. In the first exemplary embodiment, a packet synchronization switching method between the sound processing boards 10 and 20 that are redundant structures has been described. However, the present invention may also be applied to a packet synchronization switching method between data processing blades that perform other data processing beside sound, such as video or the like. In such a case, it is sufficient to provide interface blades with structures conforming with the data processing blades in the gateway device 9.

Embodiments of the present invention are described above, but the present invention is not limited to the embodiments as will be clear to those skilled in the art.

What is claimed is:

1. A packet synchronization switching method in a gateway device interconnecting first and second networks, which have different communication protocols, for synchronously performing system switching between a plurality of redundantly structured electronic circuit boards to output a sequence of packets, the electronic circuit boards including two circuit boards that are respectively in an operational state and a backup state at a time, the gateway device receiving data provided from the first network and, after performing data processing, outputting data to the second network, the method comprising:

sharing a reference timing of the data processing, and time information, in the gateway device;

performing the data processing in synchronization with the reference timing and packetizing an output of the data processing to provide packets in synchronization among the redundantly structured electronic circuit boards;

sending an instruction to a first circuit board among the redundantly structured electronic circuit boards to perform synchronization with a second circuit board among the redundantly structured electronic circuit boards, at which time the first and second circuit boards are respectively in the operational state and the backup state;

performing by the first circuit board and the second circuit board the synchronization between the first circuit board and the second circuit board according to the instruction, and then sending a notification of the completion of the synchronization;

executing the system switching between the redundantly structured electronic circuit boards in accordance with the time information after the completion of the synchronization, the first and second circuit boards being respectively in the backup state and the operational state after the execution of the system switching; and for a predetermined period after the execution of the system switching, transferring any packet received by the first circuit board in the backup state to the second circuit board in the operational state to thereby prevent packet loss, the period being in accordance with an arrival delay of the packet during the transferring of the packet from the first circuit board to the second circuit board.

2. The packet synchronization switching method according to claim 1, further comprising:

generating sequencing data of the packets and sharing the sequencing data among redundant systems of the redundantly structured electronic circuit boards.

3. The packet synchronization switching method according to claim 1, further comprising:

providing a function that transfers input packets between redundant systems of the redundantly structured electronic circuit boards; and sharing the input packets among the redundant systems to prevent losses of the input packets during the system switching.

4. The packet synchronization switching method according to claim 1, wherein the data processing includes sound processing.

5. The packet synchronization switching method according to claim 1, wherein the performing by the first circuit board and the second circuit board the synchronization includes:
sending from the first circuit board a synchronization packets at a first time, the synchronization packet including a timestamp of the first time according to a clock of the first circuit board, and sequence numbers of a plurality of packets to be transmitted; and
receiving at the second circuit board the sent synchronization packet and calculating, based on the received synchronized packet, a timestamp of a particular packet among the plurality of packets to be transmitted and a sequence number of the particular packet.

6. The packet synchronization switching method according to claim 1, further comprising before executing the system switching, sending a system switching packet to the redundantly structured electronic circuit boards, the system switching packet including information of a third circuit board that is to be switched from, and a forth circuit board that is to be switched to.

7. The packet synchronization switching method according to claim 1, wherein different packets among the packets are provided by different circuit boards among the redundantly structured electronic circuit boards.

8. The packet synchronization switching method according to claim 1, further comprising:
prohibiting, after sending the instruction to the first circuit board, the establishment of new packet paths until the notification of the completion of the synchronization is received.

9. The packet synchronization switching method according to claim 1, wherein the arrival delay of the packet is a time period between a first time at which the packet transferred from the first circuit board to the second circuit board leaves the first circuit board, and a second time at which the packet reaches the second circuit board.

10. A gateway device, comprising:
a plurality of redundantly structured electronic circuit boards, configured to receive data provided from a first network and, after performing data processing, output data to a second network, the electronic circuit boards including two circuit boards that are respectively in an operational state and a backup state at a time; and
a controller configured to generate reference timings of the data processing and time information, which are shared in the gateway device, and transmit the reference timings and the time information to the redundantly structured electronic circuit boards, and instruct system switching between the redundantly structured electronic circuit boards in accordance with the time information, wherein
the redundantly structured electronic circuit boards are configured to execute the data processing in synchronization with the reference timings and packetize an output of the data processing to provide packets in synchronization among the redundantly structured electronic circuit boards,
the controller is configured to send an instruction to a first circuit board among the redundantly structured electronic circuit boards to perform synchronization with a second circuit board among the redundantly structured electronic circuit boards, at which time the first and second circuit boards are respectively in the operational state and the backup state,
the first circuit board and the second circuit board perform the synchronization and then the second circuit board sends a notification of the completion of the synchronization to the controller,
the system switching between the redundantly structured electronic boards is synchronously performed in accordance with the instruction of the system switching and in accordance with the time information, to output the packets as a sequence of packets after completion of the synchronization, the first and second circuit boards being respectively in the backup state and the operational state after the system switching, and
for a predetermined period after the system switching, the first circuit board in the backup state transfers any packet received therein to the second circuit board in the operational state to thereby prevent packet loss, the period being in accordance with an arrival delay of the received packet during the transferring of the received packet from the first circuit board to the second circuit board.

11. The gateway device according to claim 10, wherein the first and second networks have different communication protocols.

12. The gateway device according to claim 10, wherein the controller is configured to prohibit, after sending the instruction to the first circuit board, the establishment of new packet paths until the notification of the completion of the synchronization is received.

13. The gateway device according to claim 10, wherein the arrival delay of the received packet is a time period between a first time at which the received packet transferred from the first circuit board to the second circuit board leaves the first circuit board, and a second time at which the received packet reaches the second circuit board.

14. A packet synchronization switching method in a gateway device interconnecting first and second networks and synchronously performing system switching between a plurality of redundantly structured electronic circuit boards to output a sequence of packets, the electronic circuit boards including two circuit boards that are respectively in an operational state and a backup state at a time, the method comprising:
sharing a reference timing of the data processing, and time information, in the gateway device;
performing the data processing in synchronization with the reference timing and packetizing an output of the data processing to provide packets in synchronization among the redundantly structured electronic circuit boards;
sending from a first circuit board of the plurality of redundantly structured electronic circuit boards, a synchronization packet at a first time, the synchronization packet including a timestamp of the first time according to a clock of the first circuit board, and sequence numbers of a plurality of packets to be transmitted, at which time the first circuit board is in the operational state;
receiving, at a second circuit board of the plurality of redundantly structured electronic circuit boards, the sent synchronization packet and calculating, based on the received synchronized packet, a timestamp of a particular packet among the plurality of packets to be transmitted and a sequence number of the particular packet, at which time the second circuit board is in the backup state;
executing the system switching between the redundantly structured electronic circuit boards in accordance with the time information after sending the synchronization packet, the first and second circuit boards being respectively in the backup state and the operational state after the execution of the system switching; and for a predetermined period after the execution of the system switching, transferring any packet which the first circuit board in the backup state receives from the networks, to the second circuit board in the operational state to thereby prevent packet loss, the period being in accordance with an arrival delay of the packet during the transferring of the packet from the first circuit board to the second circuit board.

15. The packet synchronization switching method according to claim 14, wherein the arrival delay of the packet is a time period between a first time at which the packet transferred from the first circuit board to the second circuit board leaves the first circuit board, and a second time at which the packet reaches the second circuit board.

* * * * *